United States Patent [19]

McDonald et al.

[11] 4,095,685

[45] Jun. 20, 1977

[54] ADJUSTABLE CLUTCH ASSEMBLY

[75] Inventors: Raymond F. McDonald, Winneconne; Merlyn L. Curtis, Oshkosh, both of Wis.

[73] Assignee: J. I. Case Company, Racine, Wis.

[21] Appl. No.: 768,116

[22] Filed: Feb. 14, 1977

[51] Int. Cl.² ............................................. F16D 13/75
[52] U.S. Cl. ................................ 192/111 B; 64/30 C; 85/35
[58] Field of Search ............. 192/111 B, 93 R, 109 A, 192/109 B; 64/30 C

[56] References Cited

U.S. PATENT DOCUMENTS

| | | | |
|---|---|---|---|
| 2,366,594 | 1/1945 | Carlson | 192/111 B X |
| 2,613,778 | 10/1952 | Carlson | 192/109 A X |
| 3,474,887 | 10/1969 | Hansen | 192/93 R |
| 3,841,453 | 10/1974 | Culbertson | 192/109 A |

*Primary Examiner*—Benjamin W. Wyche
*Attorney, Agent, or Firm*—Cullen, Settle, Sloman & Cantor

[57] ABSTRACT

A clutch having a simple adjustment mechanism permitting adjustment of the gap between the clutch elements, without disassembling the clutch. The perferred clutch includes camming rings which are spread upon actuation of the clutch to engage the clutch elements and compress the clutch spring. The adjustment mechanism includes a nut threadably received on the driven shaft, a cup-shaped slide received on the nut and biased against the camming rings by the clutch spring. During clutching, the slide is moved axially relative to the shaft by spreading the camming rings, compressing the clutch elements and biasing the spring. The clutch is adjusted by axially threading the nut on the shaft, biasing the slide against the camming rings and reducing the gap between the clutch elements.

8 Claims, 4 Drawing Figures

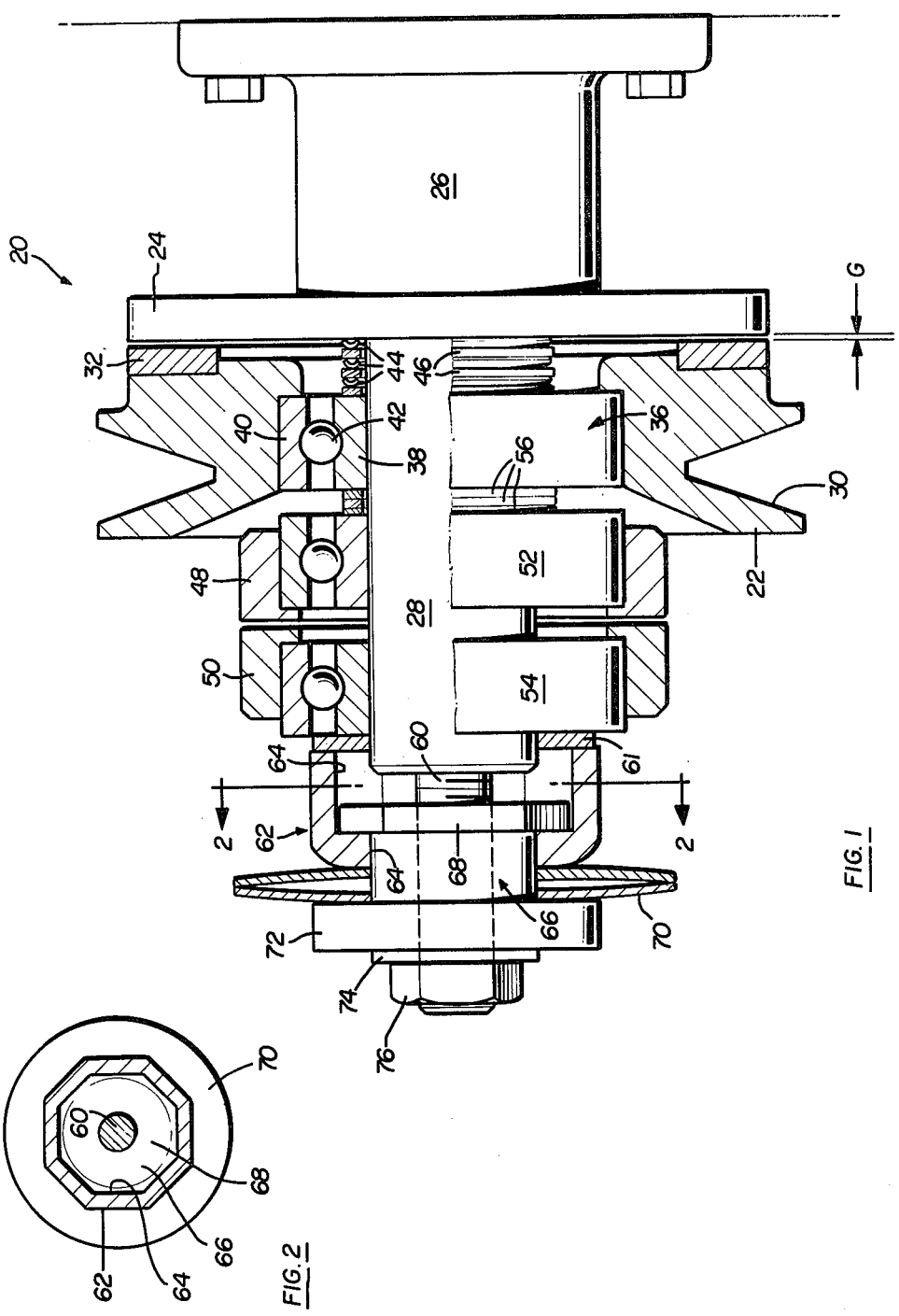

ADJUSTABLE CLUTCH ASSEMBLY

FIELD OF THE INVENTION

The present invention relates to clutches, particularly cam-type clutches. More specifically, the present invention relates to an adjustment mechanism for such clutches.

U.S. Pat. No. 3,474,887 discloses a lever operated clutch actuator of the type disclosed herein. It will be understood however that the adjustment mechanism of the present invention may be utilized in other types of clutches, particularly clutches having axially engageable elements of the type disclosed herein. The lever operated clutch disclosed in the above referenced patent includes coaxial anti-friction bearing races having opposed staggered notches providing opposed seats for a yoke-shaped lever. The lever, when rotated, cams the bearing races apart, thereby engaging the opposed clutch faces and compressing the clutch spring. This relatively simple design provides excellent and efficient service. The primary disadvantage of this design is the difficulty in ajusting the clutch for wear of the clutch disc or face.

As the clutch friction disc surface wears, the belleville spring must expand further, thus exerting less pressure through the bearing assembly to the clutch friction surfaces. Belleville springs have a very short stroke and therefore the clutch will slip when the wear exceeds the effective stroke of the spring. The gap between the clutch elements is presently adjusted for wear by first removing the split ring retaining the belleville spring. Then, the belleville spring and the first camming ring is removed. Then, the locating snap ring is removed followed by the second camming ring. The spacing or gap between the clutch elements is adjusted by adding shim washers to the spacer ring located between the second camming ring and the ring bearing of the pulley. The clutch is then reassembled and the gap checked.

Because of the clutch operation, the adjustment must be done by guess work. As described in the above referenced patent, the movable bearing element is biased against the opposed bearing element by the belleville spring. Turning the yoke-shaped lever first engages the clutch elements, then compresses the belleville spring. The belleville spring then compresses the movable clutch element against the opposed element. Thus, the gap between the clutch elements must be adjusted by trial and error. If the gap is incorrect after adjustment, the clutch must be disassembled again and shim washers added or removed. Further, the adjustment is dependent upon the thickness of the shim washers available, making accurate ajustment difficult. Thus, clutch adjustment may be ignored for a period of time, resulting in clutch slippage, because of the difficulty in adjusting the clutch.

The adjustable clutch assembly of the present invention makes clutch adjustment simple, without substantially increasing the cost of the clutch. The clutch is adjusted without disassembly simply by loosening a jam nut on the end of the shaft and rotating an adjustment nut. The gap between the clutch elements may then be accurately adjusted in place, eliminating the quess work in the prior designs. The adjustable clutch of the present invention will now be described.

SUMMARY OF THE INVENTION

The clutch assembly of the present invention preferably includes opposed clutch elements which are relatively rotatable about a common axis. One of the clutch elements is supported on a shaft, which is the driven shaft, by a bearing element for axial movement on the shaft. A spring means normally spaces the clutch elements and a clutch means urges the axially movable clutch element into frictional engagement with the opposed element, against the force of the spring means. As described above, the adjustable clutch assembly of the present invention may be lever operated as described in the above referenced United States Patent. The clutch assembly would then include opposed camming rings located on the driven shaft adjacent the movable clutch element and the clutch means spreads the camming rings, first to frictionally engage the clutch elements and then to compress the clutch spring. The clutch spring then compresses the clutch elements into frictional clutching engagement.

As described above, the clutch assembly disclosed in the prior art required disassembly to adjust the gap between the frictional elements for wear. In the adjustable clutch assembly of the present invention, the driven shaft has an axially threaded end portion which threadably receives an adjustment nut. In the preferred embodiment, the adjustment nut includes a polygonal radial flange which receives a cup-shaped slide member having a polygonal opening. The nut and slide are thus prevented from relative rotation and the slide is permitted to move axially relative to the adjustment nut and the shaft. The slide and nut are located on the shaft between the clutch spring and the movable clutch element. In the preferred embodiment having a pair of camming rings, the adjustment nut and slide are located between the spring and the camming rings, with the cup-shaped slide member opening toward and engaging the adjacent camming ring. In this embodiment, the adjustment nut flange also serves as a stop, limiting movement of the slide toward the clutch elements. The adjustment nut's axial position on the driven shaft is retained by a jam nut.

The slide and adjustment nut can not be integral because the slide must move axially independently of the nut. Upon actuation of the clutch, the camming rings are spread, such as by the lever described above. The movable clutch element is thus urged into frictional contact with the opposed clutch element. Then, the opposed camming ring is moved axially against the slide, compressing the spring and moving the slide axially relative to the adjustment nut. Finally, the clutch spring resiliently biases the assembly to urge the movable clutch element into frictional contact with the opposed element.

In the adjustable clutch assembly of the present invention, the gap between the clutch elements is adjusted by turning the slide member. First, the jam nut is loosened to release the ajustment nut. Then, the slide is rotated to thread the adjustment nut toward the clutch elements. As described above, the adjustment nut and slide include anti-rotation means, wherein the adjustment nut is threadably rotated by rotating the slide. The gap is then adjusted to the desired width and the jam nut is threaded to retain the assembly. In the preferred embodiment, the assembly includes an annular hub which compresses the spring against the slide as described above. The adjustable clutch assembly of the present invention is thus easily adjusted without special tools and without disassembling the clutch. Other advantages and meritorious features of the present invention will be more fully understood from the following description of the preferred embodiments, the appended claims and the drawings, a brief description of which follows.

BRIEF DESCRIPTION OF THE DRAWING

FIG. 1 is a side partially cross-section view of one embodiment of the adjustable clutch of the present invention;

FIG. 2 is a cross-sectional end view of FIG. 1 in the direction of view arrows 2—2;

DESCRIPTION OF THE PREFERRED EMBODIMENTS

Figure 3:
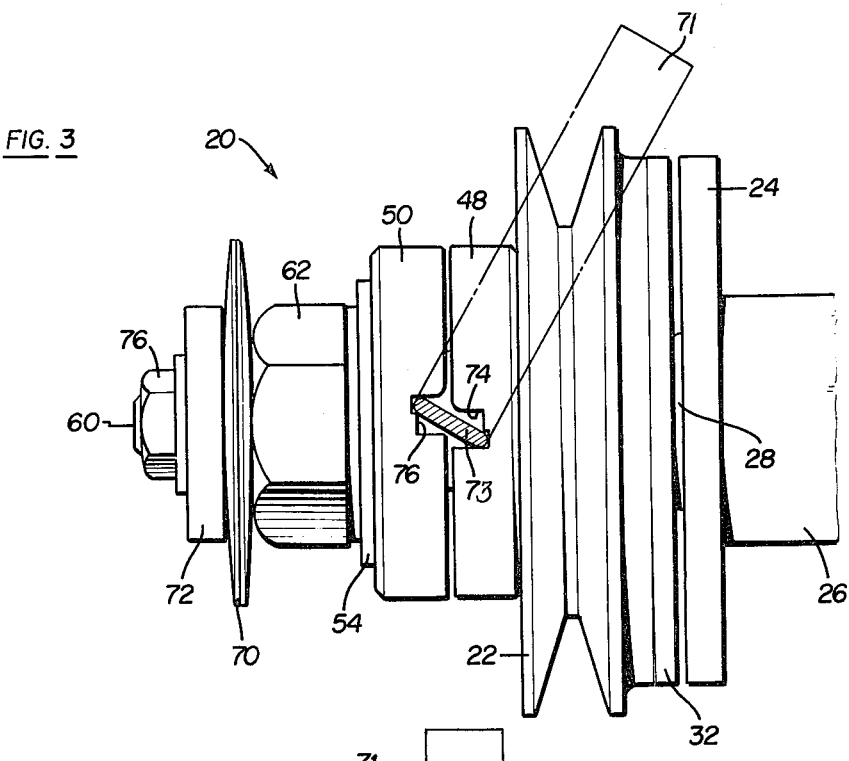
FIG. 3 is a side elevation of the adjustable clutch assembly shown in FIG. 1 when the clutch is released.

The adjustable clutch assembly 20 shown in FIG. 1 includes a rotatably pulley 22 which is the movable clutch element of the disclosed assembly. The opposed or driven clutch element 24 is connected to the driven hub 26 and shaft 28. The pulley 22 in the disclosed embodiment includes a V-shaped annular groove which receives a drive belt, not shown. The pulley 22 includes an annular clutch facing or friction disc 32. The pulley 22 is thus rotatably driven by a belt. When the clutch facing 32 is brought into frictional contact with the opposed clutch element 24, the shaft 28 and hub 26 rotate with the pulley. The clutch element 24 is keyed or otherwise secured to the shaft 28. The hub 26 is then bolted or otherwise secured to the driven member of the clutch assembly. Drive and driven elents can also be interchanged from above relationships.

The pulley 22 in the disclosed embodiment is rotatably supported on the shaft by a ring bearing 36. The ring bearing includes an inner race 38 supported on the shaft, an outer race 40 supporting the pulley 22 and a plurality of balls 42 rotatably supported between the races. The facing 32 is normally spaced from the opposed clutch element 24 by a resilient washer assembly, comprising a plurality of annular wave washers 44 and a plurality of cylindrical annular washers 46. The movable clutch element 22 is urged into frictional engagement with the opposed bearing element by the clutch actuator, which will now be described.

The clutch actuator of the disclosed embodiment may be similar to the lever operated actuator disclosed in the above referenced U.S. Pat. No. 3,474,887. As described, the actuator includes a pair of adjacent camming rings 48 and 50 which are rotatably supported on the shaft 28 by ring bearings 52 and 54, respectively. The ring bearings may be identical to the bearing 36 described above. In the disclosed embodiment, the inner ring bearing 52 is spaced from the adjacent ring bearing 36 by annular spacers or spacer 56. The camming rings 48 and 50 are spread by the clutch actuator during clutching as described in the above referenced patent and discussed hereinbelow.

In the disclosed embodiment, the shaft 28 includes an axially threaded end portion 60 which receives the clutch adjustment mechanism of the present invention. The adjustment mechanism includes a cup-shaped slide 62 having a hexagonal opening 64 as shown in FIG. 2 and a cylindrical bore 64 in the bottom of the cup portion (see FIG. 1). An adjustment nut 66 having a threaded bore 68 is threadably received on the threaded shaft 60. The cylindrical body portion of the nut is received through the cylindrical opening 64 of the slide 62 and the adjustment nut includes a hexagonally shaped radial flange 68 which is received within the hexagonal opening 64 of the slide as shown in FIGS. 1 and 2. The flange 68 thus serves as a stop for slide 62, preventing further movement of the slide toward the clutch elements 22 and 24, and the interlocking hexagonal configurations of the flange 68 and opening 64 prevents relative rotation between the adjustment nut 66 and the slide 62.

The slide 62 is urged axially toward the movable clutch element 22 by belleville spring 70 and the belleville spring is compressed and retained on the shaft by the annular hub 72, washer 74 and jam nut 76. The operation of the clutch and ajustment mechanism may now be described as follows.

The clutch 20 shown in FIG. 3 is not engaged because there is a gap "G" between the clutch face 32 and the opposed clutch element 24 as shown in FIG. 1. In the disclosed embodiment, the camming rings 48 and 50 are spread upon actuation of the clutch. In the embodiment disclosed in FIGS. 3 and 4 and described in the above referenced patent, the clutch actuator is a U-shaped lever 70 having opposed end portions or camming extremities 72 which are received in staggered slots 74 and 76 in the camming rings 48 and 50, respectively. The clutch is actuated by manually rotating or oscillating the lever from the position shown in FIG. 3 to the position shown in FIG. 4. As shown, rotation of the camming lever spreads the camming rings 48 and 50, bringing the clutch facing 32 of movable clutch element or pulley 22 into frictional engagement with the opposed clutch element 24. The actual operation of the clutch will be understood from a review of FIG. 1.

Upon actuation of the clutch, the camming ring 48 is moved to the ring in FIG. 1, moving bearing 52 against bearing 56 and the supported clutch element 22. The clutch facing 32 is thus moved into contact with the opposed clutch element 24. Continued spreading of the camming rings moves ring 50 the left in FIG. 1, moving bearing ring 54 into contact with washer 61 and slide 62, compressing belleville spring 70 against annular hub 72. The compressed spring then urges slide 62 to the right, compressing the clutch elements against spring 44. It should be noted that the slide 62 operates axially independently of the adjustment nut 66. The flange 68 serves as a stop against continued movement of slide 62 and maintains the spring 70 under compression.

The clutch facing 32 will normally wear during use, requiring adjustment of the gap "G" between the facing 32 and the opposed clutch element 24. As described above, the gap is adjusted in the clutch assemblies shown in the prior art by disassembling the clutch and inserting shim washers adjacent the spacers 56. The clutch assembly of the present invention may be adjusted, without disassembly, as follows.

Figure 4:
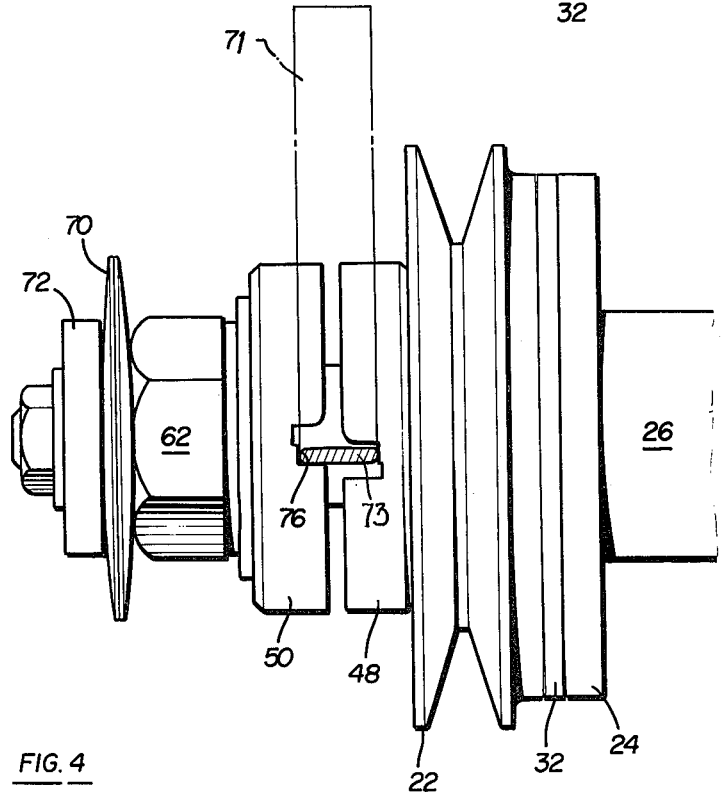
FIG. 4 is a side view, similar to FIG. 3, with the clutch engaged.

First, the jam nut 76 is loosened slightly; for example a half turn. The slide 62 is then rotated to adjust the gap "G". As shown in FIGS. 3 and 4, the exterior configuration of the slide may be hexagonal to permit rotation with a wrench or the like. Rotation of the slide will threadably rotate adjustment nut 66 because of the interlocking hexagonal configurations of the opening 64 in the slide and the flange 68 of the nut. A feeler gage may be inserted into the gap to assure accurate adjustment.

When the desired gap is achieved, the jam nut 76 is threaded onto the shaft until the hub 72 bottoms on the slide 66, assuring accurate compression of the belleville spring 70. The gap "G" has thus been easily adjusted without disassembly of the clutch. The adjustment may be made without special tools and in a matter of minutes.

It will be understood that the adjustable clutch assembly of the present invention may be modified without departing from the present invention. For example, various clutch actuation means may be utilized and the adjustment mechanism of the present invention is not limited to a lever operated clutch actuator. Further, various arrangements may be utilized and the adjustment mechanism is not limited to any particular clutch arrangement.

We claim:

1. A clutch assembly having opposed clutch elements relatively rotatably about a common axis, one of said clutch elements supported on a shaft for axial movement on a bearing, spring means normally spacing said clutch elements and clutch means urging said one clutch element into frictional engagement with the opposed clutch element, against the force of said spring means, upon actuation of said clutch, the improvement comprising:

said shaft having an axially threaded end, an adjustment nut threadably received on said shaft having a polygonal exterior portion, a cup-shaped slide member having a polygonal opening receiving said nut polygonal exterior portion in rotationally interlocking relation, said slide member having an end portion operably engaging said one clutch element and said nut having a stop means limiting axial movement of said slide toward said clutch element and a spring means normally biasing said slide means toward said clutch element, whereby the gap between said clutch elements may be adjusted by threading said adjustment nut on said shaft.

2. The clutch assembly defined in claim 1, wherein said clutch means includes camming rings supported on said shaft between said one clutch element and said slide member, said clutch means spreading said camming rings, biasing said one clutch element into frictional engagement with said opposed clutch element, said nut having a radial polygonal flange providing said stop means and said slide opening toward and engaging one of said camming rings, whereby the gap between said clutch elements may be adjusted by threading said adjustment nut toward said opposed clutch element, displacing said slide member, said camming rings and said one clutch element toward said opposed clutch element.

3. The clutch assembly defined in claim 2, wherein said assembly includes a spring element located between the end of said shaft and said slide member, normally baising said slide member into engagement with said adjustment nut flange, said spring element also biasing said slide member, said camming rings and said one clutch element into frictional engagement with said opposed clutch element, upon actuation of said clutch means.

4. The clutch assembly defined in claim 3, wherein said assembly includes a jam nut threadably received on the end of said shaft, compressing said spring element against said slide member.

5. A clutch assembly, including opposed clutch elements relatively rotatable about a common axis, one of said clutch elements having a bore receiving a shaft, said one clutch element rotationally supported on said shaft by an axially movable cylindrical bearing, opposed camming rings located on said shaft adjacent said one clutch element and clutch means spreading said camming means upon actuation of said clutch to bias said one clutch element into frictional engagement with the opposed clutch element, the improvement comprising:

said shaft having an axially threaded end portion, an adjustment nut threadably received on said shaft, a slide received on said nut having anti-rotation means preventing relative rotation between said nut and said slide, while permitting said slide to move axially relatively to said shaft, said slide having an end portion engaging one of said camming rings, spring means resiliently biasing said slide toward said one clutch element and one of said camming rings toward the opposed camming ring, whereby the gap between said clutch elements may be adjusted by threading said adjustment nut on said shaft by rotating said slide.

6. The clutch assembly defined in claim 5, wherein said ajustment nut includes a radial flange and said slide is generally cup-shaped, opening toward said clutch elements and receiving said adjustment nut flange, said flange thereby limiting movement of said slide toward said clutch elements.

7. The clutch assembly defined in claim 6, wherein said assembly includes a nut compressing said spring against said slide member.

8. The clutch assembly defined in claim 6, wherein said adjustment nut flange is polygonal and the internal wall of said cup-shaped slide is polygonal and interlocking with said flange, providing said anti-rotation and stop means.

* * * * *

UNITED STATES PATENT OFFICE
CERTIFICATE OF CORRECTION

Patent No. 4,095,685            Dated June 20, 1978

Inventor(s) Raymond F. McDonald, Merlyn L. Curtis

It is certified that error appears in the above-identified patent and that said Letters Patent are hereby corrected as shown below:

The issuance date "[45] Jun. 20, 1977" should read --Jun. 20, 1978--.

Signed and Sealed this

Sixteenth Day of January 1979

[SEAL]

Attest:

RUTH C. MASON
*Attesting Officer*

DONALD W. BANNER
*Commissioner of Patents and Trademarks*